(12) United States Patent
Hayakawa et al.

(10) Patent No.: US 8,563,148 B2
(45) Date of Patent: Oct. 22, 2013

(54) PROCESS FOR PRODUCING MAGNETIC RECORDING MEDIUM

(75) Inventors: Satoshi Hayakawa, Kitaadachi-gun (JP); Daisuke Yano, Kitaadachi-gun (JP); Yoshikazu Yamazaki, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 459 days.

(21) Appl. No.: 12/863,366

(22) PCT Filed: Jan. 20, 2009

(86) PCT No.: PCT/JP2009/050716
§ 371 (c)(1),
(2), (4) Date: Nov. 4, 2010

(87) PCT Pub. No.: WO2009/093555
PCT Pub. Date: Jul. 30, 2009

(65) Prior Publication Data
US 2011/0045319 A1      Feb. 24, 2011

(30) Foreign Application Priority Data

Jan. 21, 2008   (JP) .................. 2008-010361

(51) Int. Cl.
*G11B 5/66* (2006.01)
*B32B 5/16* (2006.01)
*B29C 65/02* (2006.01)
*B29C 65/00* (2006.01)

(52) U.S. Cl.
USPC ............... 428/840.4; 428/841.3; 428/343; 428/403; 156/308.2; 156/309.6

(58) Field of Classification Search
USPC .......... 283/82; 235/449, 493; 428/841.2, 403, 428/841.3, 327
See application file for complete search history.

(56) References Cited

U.S. PATENT DOCUMENTS 5,395,672 A * 3/1995 Pingaud .................. 428/141

FOREIGN PATENT DOCUMENTS

EP   0365448 A2   4/1990
EP   0367686 A1   5/1990
(Continued)

OTHER PUBLICATIONS

English machine translation of JP 2001-351074, Kawai et al., Japan, Dec. 2001.*

(Continued)

*Primary Examiner* — Holly Rickman
(74) *Attorney, Agent, or Firm* — Westerman, Hattori, Daniels & Adrian, LLP

(57) ABSTRACT

Subject: A process for producing a magnetic recording medium, having a magnetic recording layer and a protective layer on a substrate which is a non-magnetic support, wherein the medium is able to greatly inhibit migration of a lubricant from the protective layer to the surface of the metal pressing plate having a mirrored finish in a hot pressing step during production of the magnetic recording medium, while maintaining satisfactory scratch resistance, suitable adhesion with the magnetic recording layer and the protective layer, and excellent read and write properties of the magnetic recording medium.

Means to Achieve the Subject: A process for producing a magnetic recording medium, comprising: forming a laminate on a substrate which is a non-magnetic support, wherein the laminate has an adhesive layer, a magnetic recording layer and a protective layer in this order from the side near the substrate, and embedding the laminate into the substrate by carrying out hot pressing on the protective layer to provide a level smooth plane formed by the surface of the substrate and the uppermost surface of the laminate; wherein the protective layer contains a binder resin and particles composed of a mixture including polyethylene and polytetrafluoroethylene.

11 Claims, 3 Drawing Sheets

(56) References Cited

FOREIGN PATENT DOCUMENTS

| JP | 4-501334 A | 3/1992 |
| JP | 4-504323 A | 7/1992 |
| JP | 7-065356 A | 3/1995 |
| JP | 2001-236637 A | 8/2001 |
| JP | 2001-351074 A | 12/2001 |

OTHER PUBLICATIONS

Austrailian Office Action dated Dec. 20, 2012 cited in Application No. 2009207079 (2 pp).
International Search Report of PCT/JP2009/050716, Mailing Date of Apr. 21, 2009.

\* cited by examiner

PROCESS FOR PRODUCING MAGNETIC RECORDING MEDIUM

TECHNICAL FIELD

The present invention relates to a production process of a magnetic recording medium that is produced by forming a laminate having a magnetic recording layer and a protective layer on a substrate, which is a non-magnetic support.

BACKGROUND ART

Magnetic recording media are normally produced by laminating a magnetic laminate having a magnetic recording layer, protective layer and the like on a substrate, which is a non-magnetic support, by going through steps such as coating, transfer, lamination or the like. With the exception of the case of a coating step, a magnetic recording medium formed in this manner tends to be partially formed on a non-magnetic support. In such cases, in order to eliminate a level difference that forms between the portion where the laminate is formed and the portion where the laminate is not formed, hot pressing is carried out on the magnetic laminate after having formed the magnetic laminate on a non-magnetic support serving as the substrate to embed the magnetic laminate into the substrate and form the same smooth plane between the surface of the uppermost surface layer of the magnetic laminate, which is a protective layer, and the surface of substrate where the magnetic laminate is not formed.

Examples of methods used to form a magnetic laminate on a non-magnetic support serving as a substrate prior to hot pressing include a method in which the magnetic laminate is formed in a transfer step using mainly a transfer laminate, and a method in which the magnetic laminate is formed in a lamination step using a sticking label laminate, and protective layers directly exposed to hot pressing by a mirrored metal pressing plate are required to have various properties.

Examples of important functions required of the protective layers of thermal transfer laminates and sticking label laminates include seizure resistance, which prevents seizure on the pressing plate when subjected to hot pressing, and scratch resistance, which prevents scratches that can occur in the protective layer of a magnetic layer after it has become the uppermost layer of a magnetic recording medium. In addition, in the case of the protective layer of a thermal transfer laminate, the protective layer is required to have good releasing performance that allows it to peel easily from a transfer support during heat transfer to the substrate for the magnetic recording medium. In order to satisfy these functions, a binder resin is used in the protective layer that easily separates from the transfer support and has interlayer adhesion with the magnetic recording layer to ensure good releasing performance, while an additive such as wax is used to improve scratch resistance. Known examples of protective layer binder resins include acrylic-based resins, butyral-based resins and cellulose-based resins (see, for example, Patent Document 1), while known examples of additives for improving scratch resistance include fatty acids and salts thereof, various types of wax (see, for example, Patent Document 2) and fluororesin particles (see, for example, Patent Document 3).

In an actual production process of a magnetic recording medium, for example, after heat-transferring a laminate containing a magnetic recording layer on a transfer support onto a substrate, which is a non-magnetic support, the transfer support is peeled off, and hot pressing using a metal pressing plate polished to a mirrored finish is carried out on a laminate containing a magnetic recording layer wherein a protective layer has been transferred as the uppermost layer. Alternatively, a sticking label laminate is arranged on a substrate while providing an adhesive layer there between as necessary, and hot pressing is carried out that presses the substrate onto a protective layer using a metal pressing plate polished to a mirrored finish. In particular, numerous magnetic recording media referred to as magnetic cards, in which a magnetic stripe is arranged on a portion of a paper or plastic substrate by the above-mentioned processing methods, are produced and widely used throughout the world.

Polyethylene wax, which has conventionally been preferably used as a wax for improving scratch resistance, functions as a lubricant on the protective layer of a magnetic recording medium such as a magnetic card due to its own inherent superior scratch resistance and the lubricity of a low melting point wax component that is melted by heat during hot pressing, and imparts preferable durability for practical use as a magnetic recording medium by reducing wear of the protective layer caused by a magnetic head used for magnetic recording and reading.

However, when carrying out hot pressing using a metal pressing plate polished to a mirrored finish in a production process of a magnetic recording medium, a portion of the polyethylene wax component added to the conventional protective layer ends up migrating to the surface of the metal pressing plate, thereby resulting in the problem of soiling the pressing plate.

In addition, in the case of adding polytetrafluoroethylene (to also be abbreviated as PTFE) particles, which are a type of fluororesin particles conventionally known to be an additive for improving scratch resistance, as lubricant, due to the high melting point of the PTFE particles themselves, they do not migrate to the metal pressing plate having a mirrored finish surface during hot pressing, thereby allowing the obtaining of satisfactory lubricity-imparting effects. However, due to inferior adhesion with binder resin, PTFE particles end up degranulating from the binder resin during magnetic card production and during routine handling such as that during magnetic reading and writing, thereby making it difficult to obtain preferable durability for practical use as a magnetic recording medium.

Although it is effective to reduce the amount of polyethylene wax added or use a polyethylene wax having a low degree of migration in order to reduce migration of the polyethylene wax component to the metal pressing plate as described above, in any of such cases, surface lubricity of the protective layer decreased and it became difficult to obtain preferable durability for practical use as a magnetic recording medium.

In this manner, when hot pressing is carried out using a metal pressing plate polished to a mirrored finish in a production process of a magnetic recording medium as described above, if migration of a wax component used as a lubricant into the metal pressing plate is attempted to be inhibited, it is difficult to obtain durability for use as a magnetic recording medium. On the other hand, when scratch resistance of the magnetic recording medium to a magnetic head is attempted to be improved, there was the problem of the additive used for that purpose, and mainly the wax component used as a lubricant, ending up migrating to the surface of the metal pressing plate of the press. In the case of continuously carrying out hot pressing in particular, the migrated component ended up accumulating, causing the accumulated component to transfer to the magnetic recording medium, or leave a mark or cause other problems such as soiling or deforming a pattern formed on the magnetic recording medium. Consequently, it was necessary to periodically clean the surface of the metal pressing plate thereby causing a decrease in production efficiency.

Patent Document 1: Japanese Unexamined Patent Application, First Publication No. H7-65356 (page 3)

Patent Document 2: Japanese Unexamined Patent Application, First Publication No. 2001-236637 (page 4)

Patent Document 3: Japanese Unexamined Patent Application, First Publication No. 2001-351074 (page 3)

DISCLOSURE OF THE INVENTION

Problems to be Solved by the Invention

An object of the present invention is to provide a process for producing a magnetic recording medium, having a magnetic recording layer and a protective layer on a substrate in the form of a non-magnetic support. The production process is able to realize superior production efficiency without causing soiling or deformation of the surface of a metal pressing plate, and ultimately the surface of the magnetic recording medium, in a production step, by inhibiting migration of a lubricant from the protective layer to the surface of the metal pressing plate having a mirrored finish in a hot pressing step during production of the magnetic recording medium, while maintaining satisfactory scratch resistance of the protective layer and adhesion between the magnetic recording layer and the protective layer.

Means for Solving the Problems

As a result of conducting extensive studies on protective layer additives used for the purpose of modifying the protective layer of a heat transfer laminate or sticking label laminate used to laminate a magnetic laminate onto a substrate, which is a non-magnetic support, in order to solve the above-mentioned problems, the inventors of the present invention found that by stipulating the type, particle diameter and the like of wax particles used as an additive, scratch resistance can be realized and adherence of additives such as wax to the surface of a metal pressing plate having a mirrored finish used for hot pressing can be prevented during production thereof, while maintaining satisfactory read and write properties of the magnetic recording layer produced. Moreover, in the case of a protective layer of a heat transfer laminate, with the consideration for the additional requirement of good releasing performance, and measures for that requirement were examined, thereby leading to completion of the present invention.

Namely, the present invention provides a process for producing a magnetic recording medium, comprising:

forming a laminate on a substrate which is a non-magnetic support, wherein the laminate has an adhesive layer, a magnetic recording layer and a protective layer in this order from the side near the substrate, and embedding the laminate into the substrate by carrying out hot pressing on the protective layer to provide a level smooth plane formed by the surface of the substrate and the uppermost surface of the laminate;

wherein the protective layer contains a binder resin and particles composed of a mixture including polyethylene and polytetrafluoroethylene.

In addition, the present invention provides a process for producing a magnetic recording medium as described above, wherein formation of the laminate on the substrate is carried out by going through a transfer step using a heat transfer laminate.

Moreover, the present invention provides a heat transfer laminate, wherein at least a protective layer, a magnetic recording layer and an adhesive layer are laminated in this order on a transfer support, and the protective layer contains a binder resin and particles composed of a mixture including polyethylene and polytetrafluoroethylene.

In addition, the present invention provides a process for producing a magnetic recording medium, wherein formation of the laminate formed on the substrate is carried out by going through a lamination step of a sticking label laminate, wherein the sticking label laminate comprises a magnetic recording layer and a protective layer on one side of a support in this order from the side near the support, and also has an adhesive layer, which exists at the other side of the lamination support.

Moreover, the present invention provides a sticking label laminate comprising a magnetic recording layer and a protective layer on one side of a support in this order from the side near the support, wherein the protective layer contains a binder resin and particles composed of a mixture including polyethylene and polytetrafluoroethylene.

According to the process for producing a magnetic recording medium of the present invention, the protective layer contains particles composed of a mixture of polyethylene and PTFE. Accordingly, even if a step is carried out in which a laminate is embedded in a substrate used for the magnetic recording medium by carrying out hot pressing on the protective layer after having formed the laminate including a magnetic recording layer and a protective layer on a substrate, which is a non-magnetic support, the polyethylene included in the protective layer as a lubricant does not migrate to a mirrored plate of a hot press.

A heat transfer laminate or lamination laminate used in the production process of the present invention contains wax particles composed of a mixture of polyethylene and PTFE in a protective layer. Therefore, the protective layer of the magnetic recording medium, which is produced in a heat transfer step or lamination step using the heat transfer laminate or the sticking label laminate, has satisfactory scratch resistance and the presence of PTFE in the protective layer inhibits migration of polyethylene wax to a metal pressing plate during hot pressing in the production process of the magnetic recording medium. Consequently, the surface of the resulting magnetic recording medium is resistant to soiling or deformation caused by re-migration of polyethylene wax initially adhered to the metal pressing plate, and design qualities resulting from characters or patterns formed on the surface of the magnetic recording medium are not impaired.

In addition, according to the process for producing a magnetic recording medium of the present invention that uses a heat transfer step or lamination step as previously described, a heat transfer laminate or sticking label laminate are used that contain wax particles composed of a mixture of polyethylene and PTFE in the protective layer. Therefore, migration of wax to a metal pressing plate is inhibited during hot pressing from over the protective layer after having formed the magnetic recording layer and protective layer on a substrate in the heat transfer step or lamination step, and the frequency at which the metal pressing plate is cleaned is reduced considerably, thereby greatly improving production efficiency.

When consideration is given to the mechanism of the displayed function of lubricant added to the protective layer, the reason why the heat transfer laminate or sicking label laminate of the present invention, and a magnetic recording medium subsequent produced there from, demonstrate the aforementioned effects is supposed as follows.

The durability of a magnetic recording medium is dependent upon the wear resistance of the protective layer of the heat transfer laminate or sticking label laminate, and wear resistance of the protective layer is mainly influenced by the properties of the lubricant dispersed in the binder resin.

A conventional heat transfer laminate or sticking label laminate, which is produced by dispersing polyethylene wax particles having superior lubricity in a protective layer, alleviates the affects of abrasion caused by a magnetic head during magnetic reading and writing, due to the flexibility, wear resistance of the polyethylene particles themselves, the good adhesiveness of the wax with the binder resin, and lubricating property achieved by wax effect.

However, the surface of the protective layer is subjected to heat and pressure from a hot pressing step during formation of the magnetic recording medium or the protective layer. Although the heating temperature and applied pressure applied in this step vary slightly according to the composition of the magnetic recording medium to be produced and the apparatus used in the hot pressing step, in a normal production process, a hot pressing step is used that employs a metal plate having mirrored finish surface, the heat and pressure are applied to the protective layer at a heating temperature of 120 to 180° C. and applied pressure of 10 to 25 kgf/cm$^2$.

Consequently, in the case of attempting to realize durability required by a magnetic recording medium with polyethylene wax particles alone, a portion of the polyethylene wax that has softened (or melted) in the hot pressing step of the magnetic recording medium ends up migrating to the surface of the metal pressing plate polished to a mirrored finish, thereby soiling the plate. This migrating lubricant component is a low molecular weight component (or low melting point component) of polyethylene wax, and in this case, this component is thought to mainly demonstrate lubricity improving effects. For this reason, improvement of wax migration can be improved by either considerably reducing this low molecular weight component, or as an alternative thereto, adding medium to high molecular weight polyethylene particles in the protective layer that are resistant to migration to the surface of the metal pressing plate. However, when the amount of low molecular weight component of the wax is significantly reduced, lubricity becomes poor, which together with increasing susceptibility to the occurrence of abrasions on the surface of the protective layer, increases the likelihood of the polyethylene particles degranulating from the coated film, thereby lowering the wear resistance of the protective layer of the heat transfer laminate and resulting in a lack of durability of the magnetic recording medium. The cause of the increased susceptibility to degranulation of the polyethylene particles is attributable to an increase in friction between the protective layer of the magnetic recording medium and a magnetic head caused by a decrease in lubricity of the coated film due to a decrease in low molecular weight components having high lubricity improving effects, and an increase in particle hardness caused by an increase in molecular weight of the polyethylene particles, thereby weakening the action of relieving stress of the magnetic head due to elasticity of the particles.

Similarly, even in the case of dispersing a lubricant such as silica particles, which are free of migrating components, in the protective layer, the degree of lubricity imparted by these particles is inadequate, thereby causing a considerable decrease in wear resistance of the protective layer of the heat transfer laminate.

On the other hand, in the case of dispersing PTFE particles, which are thought to a lubricant that demonstrates high lubricity while also being free of migrating components, in the protective layer, wear resistance of the protective layer of the heat transfer laminate tends to improve as compared with case of not adding these particles, and there is also no migration to the surface of the metal pressing plate. However, since PTFE particles lack adequate adhesion with binder resin, and easily degranulate from the coated film due to abrasion by a magnetic head, adequate wear resistance is unable to be obtained.

In addition, since a magnetic head rubs over the surface of the protective layer while applying pressure at a prescribed force, the wax particles themselves in the protective layer are required to have suitable hardness (flexibility) in order to prevent degranulation and damage to the surface of the magnetic head. Polyethylene wax is superior with respect to these points. Thus, overall, conventionally used polyethylene particles are considered to be a preferable material with the exception of their wax migration properties.

On the basis of the above, the wear resistance of a protective layer of a heat transfer laminate is typically estimated based on the comprehensive effects of the wear resistance, flexibility and abrasion resistance of the wax particles themselves dispersed in the protective layer, satisfactory adhesion with binder resin and lubricity of the particles themselves in opposition to the abrasive force attributable to the magnetic head. In the case of polyethylene wax, for example, which has conventionally been used as a satisfactory lubricant, wear resistance of the protective layer of the heat transfer laminate or sticking label laminate is based on a tradeoff with the ease of migration of the wax component to a mirrored plate for hot pressing.

Here, a composition is considered in which a polyethylene resin component, which is suitable in terms of flexibility and wear resistance of the wax particles themselves as well as satisfactory adhesion with binder resin, is used as a main constituent, PTFE is mixed into the polyethylene wax at the stage of particle production, and wax particles obtained by finely granulating this mixture are dispersed in a protective layer. The PTFE particles are retained in the binder resin as a result of being present in the polyethylene wax. The PTFE component is able to suppress the migration of polyethylene component to the surface of a metal pressing plate by supplementing the conventional lubricity of polyethylene alone with the lubricity resulting from the non-migrating PTFE component. In addition, the presence of the polyethylene wax prevents the degranulation of PTFE component from the binder resin due to having greater flexibility than PTFE. More preferably, these composite particles are irregularly-shaped, non-spherical particles, such that plural PTFE particles are present on the surface of the polyethylene wax particles, and are in a form in which at least a portion of the PTFE particles are embedded within the wax particles. Due to the form, adhesion between the composite particles containing PTFE particles and the binder resin is further improved, while also more effectively inhibiting degranulation from the coated film. Even more preferably, by composing the composite particles such that a portion of the PTFE particles are exposed on the surface of the wax particles, contact pressure between the polyethylene wax and the surface of the metal pressing plate decreases, which together with further enhancing lubricity attributable to the wax particles, is thought to add the effect of further inhibiting migration of the wax. In this manner, by using wax particles composed of a mixture of polyethylene and PTFE, both components mutually supplement the property of each other, then the adjustment for making enable both wear resistance and inhibition of lubricant migration is realized simultaneously.

Effects of the Invention

The process for producing a magnetic recording medium of the present invention has a step for forming a laminate having a magnetic recording layer and a protective layer on a substrate in the form of a non-magnetic support, followed by carrying out hot pressing on the protective layer to embed the laminate into the non-magnetic support serving as the substrate. Since the protective layer contains particles composed of a mixture of polyethylene and PTFE, and a binder resin, the protective layer demonstrates satisfactory durability, retains satisfactory seizure resistance in the hot pressing step, and is able to considerably reduce migration of the wax component into mirror-finished metal pressing plate of the hot press.

The heat transfer laminate used in the process for producing a magnetic recording medium of the present invention has a protective layer, which has superior scratch resistance while maintaining excellent peeling performance in the transfer step as well as satisfactory adhesion properties with the magnetic recording layer, and when a magnetic recording medium is produced by applying hot pressing from over the protective layer, there is no migration of lubricant such as wax to the metal pressing plate. Thus, there is no occurrence of soiling or deformation on the surface of the magnetic recording medium produced due to migration of wax or other lubricant through the metal pressing plate. In addition, since the frequency of cleaning the metal pressing plate is lowered considerably as a result thereof, production efficiency increases considerably. Moreover, there is no decrease in read and write properties of these magnetic recording media on which the protective layer is formed.

The sticking label laminate used in the process for producing a magnetic recording medium of the present invention realizes superior scratch resistance of a protective layer formed, while maintaining satisfactory adhesion with the magnetic recording layer, and when a magnetic recording medium is produced by applying hot pressing from over the protective layer, there is no migration of lubricant such as wax to the metal pressing plate. Thus, there is no occurrence of soiling or deformation on the surface of the magnetic recording medium produced due to migration of lubricant such as wax through the metal pressing plate. In addition, since the frequency of cleaning the metal pressing plate is lowered considerably as a result thereof, production efficiency increases considerably. Moreover, there is no decrease in read and write properties of these magnetic recording media on which the protective layer is formed.

BEST MODE FOR CARRYING OUT THE INVENTION

In the heat transfer laminate or sticking label laminate used in the production process of the present invention, it is possible to produce wax particles composed of a mixture of polyethylene and PTFE by combining polyethylene particles and PTFE particles by mechanically mixing and stirring in order to reduce migration of a low molecular weight component of the polyethylene wax to a metal pressing plate and effectively supplement the resulting decrease in lubricity with PTFE particles. However, it is preferable to produce a mixture containing polyethylene and PTFE in advance in the wax particle production process, and produce wax particles from this mixture by going through a known particle production process, and to use the wax particles.

The wax particles contained in the protective layer of the heat transfer laminate or sticking label laminate in the present invention are preferably polyethylene wax particles in which at least a portion of PTFE particles are embedded in the particles. Composite particles is also preferable wherein the particles contains PTFE particles of which a portion thereof is embedded in the surface of particles consisting mainly of polyethylene, while a portion thereof is exposed on the surface of the particles. The composite particles composed of a mixture of polyethylene and PTFE preferably have a non-spherical, irregular shape.

The volume average particle diameter of the wax particles contained in the protective layer is preferably 6 μm or less.

In addition, a cellulose derivative resin is preferably contained as a main component of the binder resin used as the binder resin for the protective layer of the heat transfer laminate, and a cellulose acetate resin is particularly preferable as a cellulose derivative resin.

The following provides a more detailed explanation of the heat transfer laminate, sticking label laminate, magnetic recording medium produced using the heat transfer laminate or sticking label laminate, and process for producing a magnetic recording medium in the present invention.

In the present invention, a magnetic recording medium refers to, for example, magnetic discs and tapes, magnetic cards such as plastic credit cards and ATM cards, magnetic passbooks made of synthetic paper such as bank passbooks, or magnetic tickets such as paper passenger tickets and boarding passes. In addition, although not counted as a magnetic recording medium in the present invention, magnetic tape provided on magnetic cards (also referred to as magnetic stripes) as well as the "heat transfer laminate" and "sticking label laminate" to be described later per se are also considered to be contained in category of magnetic recording media in the broad classification thereof.

First, an explanation is provided of the heat transfer laminate used in the process for producing a magnetic recording medium of the present invention, along with an explanation of the process for producing a magnetic recording medium of the present invention using that heat transfer laminate. A detailed explanation is then provided of the sticking label laminate and an explanation of the process for producing a magnetic recording medium of the present invention using that sticking label laminate.

The heat transfer laminate of the present invention refers to a heat transfer magnetic sheet (or a transfer magnetic tape when processed into the form of a tape) wherein a magnetic recording layer and other functional layer are laminated and it is mainly used to produce a magnetic card, and the heat transfer laminate is composed to allow a layer containing the magnetic recording layer to be heat-transferred to a substrate for the magnetic recording medium. The heat transfer laminate has a layered structure comprising the formation of at least three layers consisting of a protective layer, which is the uppermost layer in the finished product, magnetic recording layer and adhesive layer in that order on a transfer support that is a non-magnetic substrate (see FIG. 1). The adhesive layer is contacted with and fixed on the substrate for the magnetic recording medium, and following transfer, the transfer support is peeled from the interface with the protective layer. When subjected to hot pressing over the protective layer, a laminate from which the transfer support has been removed is embedded in the substrate for the magnetic recording medium.

The specific wax used in the protective layer of the thermal transfer laminate of the present invention is wax particles composed of a mixture of polyethylene and PTFE. A commercially available example of such wax particles is "Fluoroslip 731MG", which is a polyethylene/PTFE wax manufactured by Shamrock Technologies, Inc. PTFE has a melting point of 327° C., which is much higher than that of ordinary polyethylene, has superior heat resistance and chemical resistance, resists nearly all organic solvents, acids and substrates, has superior water repellency, oil repellency and electrical properties, and has a low coefficient of friction. Normally, PTFE is mixed with polyethylene as particulate PTFE, which is obtained by radical polymerization of tetrafluoroethylene by suspension polymerization or emulsion polymerization, and that having a volume average particle diameter of about 0.3 to 3 μm is thought to preferably be incorporated within polyethylene particles as PTFE particles having a degree of polymerization suitable for mixing. PTFE particles that allow particle diameter to be adjusted by crushing using a ball mill or other crushing apparatus are preferable.

In order to produce wax particles composed of a mixture of polyethylene and PTFE, the aforementioned PTFE particles are dispersed in polyethylene or a monomer compounds thereof in a known process for producing polyethylene wax particles so that the PTFE particles are incorporated within the polyethylene during a production step, and a wax that contains PTFE particles and is in a particulate state at room temperature can be produced by carrying out a procedure similar to an ordinary process for producing polyethylene wax particles in the presence of the PTFE particles.

Although various polyethylene waxes of a molecular weight that is conventionally used as wax can be used for the polyethylene wax, the amount of migrating components is preferably reduced in advance by reducing the amount of low molecular weight components to a degree that prevents susceptibility to degranulation without causing surface hardness to become excessively high.

Moreover, other waxes such as carnauba wax, capable of being premixed in the production process of the wax particles, can also be added as necessary.

Although the degree in which the mixing ratio of PTFE and polyethylene wax is adjusted differs according whether the property to be emphasized the most is wear resistance or inhibition of lubricant migration, and the mixing ratio can be suitably adjusted corresponding to the production process conditions and usage conditions of the magnetic recording medium, the amount of PTFE is preferably 0.2 to 70% by mass of the entire lubricant component, and is more preferably 1 to 30% by mass, at which the particle is more stable as a composite particle.

In the present invention, although making the volume average particle diameter of the wax particles serving as the aforementioned composite particles to be 6 μm or less is preferable with respect to the balance with film thickness of the protective layer and uniformity of the distribution of wax particles, it is more preferably 3 μm or less. The protective layer of the present invention is a heat transfer protective layer for protecting a pattern layer and magnetic recording layer from hot pressing during production of the magnetic recording medium, and even if particle diameter is somewhat larger than the standard film thickness of the protective layer of 0.5 to 3 μm, the particles do not protrude from the surface of the protective layer of the magnetic recording medium after heat transfer. However, a portion of the wax particles added are exposed from the surface of the protective layer of the magnetic recording medium corresponding to the amount added and particle size thereof, and a portion of the wax component migrates from that exposed portion to a mirrored finish plate used for hot pressing. Normally, a larger wax particle diameter results in a stronger tendency for the wax particles to migrate. Consequently, making the particle diameter equal to or less than the aforementioned average particle diameter makes it possible to reduce the exposed area on the surface of the protective layer, inhibit elution of the wax component from the exposed portion of the wax particles during hot pressing, and inhibit migration to the surface of the mirrored finish metal pressing plate during hot pressing.

Moreover, in the present invention, the use of a non-spherical irregular shape for the PTFE component of the aforementioned wax particles increases resistance to degranulation from the binder particles, thereby making it possible to obtain the effect of imparting superior lubricity.

In addition, composite particles are preferable wherein at least a portion of the PTFE particles is embedded in the particles composed mainly of polyethylene. The use of such composite particles makes it possible to prevent the PTFE particles from coming off. More preferably, a plurality of PTFE particles are present on the surface of particles composed mainly of polyethylene, a portion of the PTFE particles are embedded within the particles, and a portion of the PTFE particles are exposed on the surface of the particles. Due to such a state, it would appear that the effect of inhibiting the migrating components eluting from the polyethylene component in the composite particles during hot pressing from migrating to the surface of a mirrored-finish pressing plate used for hot pressing is realized.

The amount of wax added is preferably 1 to 10% by mass and more preferably 2 to 5% by mass based on the binder resin of the protective layer. In the case the added amount is less than 1% by weight, adequate surface lubricity of the protective layer is not obtained, while in the case the added amount exceeds 10% by weight, the coated film of the protective layer becomes brittle, and it becomes difficult to obtain durability preferable for practical use as a magnetic recording medium.

The binder resin contained in the protective layer of the heat transfer laminate of the present invention is preferably that which has high coatability and film formability in the case of forming a coated film, has comparatively high elastic modulus, has excellent releasing performance at the interface with the transfer support, and has satisfactory heat resistance when it becomes the uppermost layer after transfer. Various binder resins conventionally used in protective layers can be used when they have such properties. Examples of binder resins that can be used include fiber-based resins such as nitrocellulose, synthetic resins such as acrylic resins, and these binder resins can be used alone or a plurality of types can be used in combination. In the present invention, a preferable composition is that consisting mainly of a cellulose derivative resin that is comparatively hard, has satisfactory coatability and has superior releasability, and which is crosslinked by the addition of an isocyanate compound. This composition is particularly preferable in terms of releasability when a PET film is used for the transfer support. The weight average molecular weight of a cellulose derivative resin preferable for the protective layer of the present invention is 10,000 to 70,000. Here, if the molecular weight is excessively low, satisfactory properties relating to the production process, such as good releasability or releasing stability over time are not realized, while conversely if the molecular weight is excessively high, coating viscosity increases making it difficult to apply a thin film.

Specific examples of cellulose derivative resins include those having superior releasability with PET film such as cellulose acetate, cellulose acetate butyrate, cellulose acetate nitrate or cellulose acetate propionate. Cellulose acetate resin (cellulose acetate) and cellulose acetate propionate are particularly preferable in terms of releasability when a PET film is used for the transfer support, and in terms of satisfactory adhesion to a magnetic recording layer when vinyl chloride resin or polyurethane resin is used for the main binder resin. Cellulose acetate resin is particularly preferable. These can be used alone or as a mixture.

The hydroxyl group content of the aforementioned cellulose derivative resins is preferably within the range of 1 to 7%. Namely, in the case of low hydroxyl group content, heat resistance and mechanical strength properties (such as abrasion resistance) tend to decrease, resulting in the possibility of the occurrence of seizure during hot press processing and damage to the protective layer when magnetic head moves. Conversely, in the case of high hydroxyl group content, it tends to be difficult to form a coating due to poor solubility in organic solvent, and a coating tends to increase in viscosity in response to addition of a crosslinking promoter (curing agent), thereby resulting in the potential for the occurrence of problems in a coating step.

The aforementioned crosslinking promoter is an isocyanate compound or the like that is added to improve mechanical strength properties such as abrasion resistance of the protective layer, and promotes curing by causing a crosslinking reaction. The amount of this isocyanate compound used is preferably 1 to 30 parts by mass based on 100 parts by mass of the binder resin.

Preparation of the protective layer coating used in the present invention is carried out by mixing and stirring wax particles composed of a mixture of polyethylene and polytetrafluoroethylene as previously described, the aforementioned binder resin, and as necessary, a known commonly used dispersion stabilizer, surfactant or anti-blocking agent and the like, with a stirring machine such as a disper in a solvent for mixing such as acetone, ethyl acetate, cyclohexanone or toluene and the like, followed by uniformly dispersing. The solid content of the coating at this time is preferably 5 to 35%.

Although a wide range of known materials and compositions can be used for the magnetic recording layer of the heat transfer laminate of the present invention, producing the magnetic recording layer by using a coating step using a magnetic recording layer coating is preferable in terms of increasing the degree of freedom when selecting the materials used, being able to easily accommodate various shapes, film thicknesses and the like, and being able to achieve low-cost.

Examples of magnetic materials used in the case of producing a magnetic recording layer of the heat transfer laminate of the present invention using a magnetic recording layer coating include known commonly used materials in the manner of magnetic powders such as γ-iron oxide, magnetite, cobalt-coated iron oxide, chromium dioxide, iron-based metal magnetic powders, strontium ferrite and barium ferrite. Examples of binder resins used in the magnetic recording layer coating include known, commonly used resins such as polyvinyl chloride-based resins, acrylic-based resins, acrylurethane resins, nitrocellulose resin, polyurethane and polyester, and these resins can be used alone or as a mixture.

Preparation of the magnetic recording layer coating is carried out by dissolving and/or dispersing the aforementioned magnetic powder, 20 to 30% by mass of the aforementioned binder resin based thereon, and as necessary, a known, commonly used dispersion stabilizer, surfactant or resin filler and the like in a solvent for mixing such as methyl ethyl ketone, toluene or cyclohexanone and the like. The solid content of the coating at that time is preferably 25 to 60% by mass. In addition, a known, commonly used dispersing machine such as a ball mill or sand grinding mill can be used for dissolution and/or dispersion.

The adhesive layer of the heat transfer laminate of the present invention can be formed by going through a coating step of an adhesive layer coating containing a known adhesive binder resin. The binder resin for the adhesive layer is preferably a thermoplastic binder resin that is tack-free at room temperature, but demonstrates viscous adhesion when heated, and a known, commonly used thermoplastic resin can be used, examples of which include polyvinyl chloride-based resins and polyurethane-based resins. Preparation of the adhesive layer coating can be carried out by, for example, dissolving the aforementioned binder resin in a solvent for mixing such as methyl ethyl ketone and toluene to a concentration of 3 to 70% by mass. In addition, an anti-blocking agent such as silica can also be added as necessary.

Examples of a transfer support able to be used in the heat transfer laminate of the present invention typically include synthetic resin films and synthetic paper referred to as release paper, and can be selected without any particular limitations provided it matches the conditions of use. In the present invention, a synthetic resin film is preferable, and in particular, a polyethylene terephthlate (PET) film having a thickness of 12 to 50 μm is more preferable in terms of heat resistance, tensile strength and the like.

The process for producing the heat transfer laminate of the present invention can be carried out by at least forming a protective layer, a magnetic recording layer and an adhesive layer in that order on the aforementioned transfer support. Each layer can be formed by simultaneously or sequentially applying a coating for forming each layer by a coating step, and the dry coated film thickness of the protective layer is preferably 0.3 to 3 μm. There are no particular limitations on the coating method, a known, commonly used method can be used, and production can be carried out by employing a process for producing coated products having a single-layer or multi-layer composition. Specific examples of coating methods include gravure coating, reverse coating, air doctor coating, blade coating, air knife coating, squeeze coating, impregnation coating, transfer roll coating, kiss coating, cast coating, spray coating and die coating.

Formation of the magnetic recording layer is carried out by adding an isocyanate compound as a curing agent to the aforementioned magnetic recording layer coating, and coating it on the previously described protective layer so that the dry coated film thickness is 2 to 30 μm, followed by heat curing treatment. There are no particular limitations on the coating method, and the same coating methods as those used to coat the protective layer can be used.

Formation of the adhesive layer can be carried out by coating the aforementioned adhesive layer coating on the magnetic recording layer so that a dry coated film thickness of the adhesive layer is 0.3 to 10 μm. There are no particular limitations on the coating method, and the same coating methods as those used to coat the protective layer can be used. Although a laminate is typically formed on the transfer support as described above by sequentially providing the coating of each layer by a coating step, the laminate can also be produced by a transfer step using a heat transfer laminate to form each layer.

The heat transfer laminate may also be produced so that a colored layer (blocking layer) or colored layer and pattern layer in that order are formed and a protective layer is formed thereon when the heat transfer laminate is transferred to a substrate for a magnetic recording medium, in order to impart even higher design qualities by blocking a hue of the magnetic recording layer. In this case, after having formed the protective layer on the transfer support, the colored layer is formed or the pattern layer and the colored layer are formed in that order, and then, the magnetic recording layer and adhesive layer are laminated. A known production method can be used to produce the colored layer (blocking layer) and pattern layer.

In order to produce a magnetic card, for example, using a heat transfer laminate (see FIG. 1) produced using the process described above, production can be carried out by going through a transfer step for transferring a laminate existing on a heat transfer laminate using a known transfer technology to a substrate used for a conventionally known magnetic card, and a hot pressing step for applying heat which is performed as necessary. For example, in the transfer step, by employing a step in which the adhesive layer side of a heat transfer laminate, having a protective layer, magnetic recording layer and adhesive layer on a transfer support, is adhered to the surface of a non-magnetic support which is a magnetic recording medium substrate, and after adhering by applying pressure or heat and pressure from the side of the transfer support, the transfer support is peeled from the interface with the protective layer, a laminate having an adhesive layer, magnetic recording layer and protective layer can be formed on a magnetic recording medium substrate such as a magnetic card. At this time, slitting process is made in advance to make the heat transfer laminate cut to the width of the laminate formed in the transfer step, and this tape is then heat-transferred onto a substrate for a magnetic card and the like.

According to the application, various materials can be applied for the magnetic recording medium substrate, on which heat-transfer is performed using the heat transfer laminate, in so far as the materials has mechanical strength capable of withstanding repeated use, chemical resistance, solvent resistance and heat resistance capable of withstanding production. Examples of substrates that can be applied include paper such as wood-free paper, OCR paper, non-carbon paper and art paper, and various plastic films. Examples of plastic film materials include polyester-based resins such as polyethylene terephthalate or polyethylene naphthalate, polyamide-based resins such as nylon 6 or nylon 66, polyolefin-based resins such as polyethylene or polypropylene, vinyl resins such as polyvinyl chloride, acrylic resins such as polyacrylate, polymethacrylate or polymethyl methacrylate, and polycarbonates.

The substrate film may be copolymer resin containing these resins as main components thereof, a mixture of the resins, or a laminate composed of multiple layers. In general, from the viewpoints of mechanical strength and cost, polyester-based films such as polyethylene terephthalate or polyethylene naphthalate, and vinyl-based films such as polyvinyl chloride are used preferably.

Before coating, the surface of the substrate film, on which coating will be performed, may be subjected to adhesion facilitation treatment such as corona discharge treatment, plasma treatment, ozone treatment or primer coating treatment involving the application of an adhesion facilitation agent. In addition, an additive such as a filler, plasticizer, colorant or antistatic agent may be added to the resin film as necessary. Examples of fillers that can be applied include extender pigments such as silica or calcium carbonate, and normally a white substrate is used that contains a pigment such as titanium oxide.

The thickness of the substrate is preferably that which allows overall rigidity to be suitably maintained, and a substrate having a thickness of 100 to 800 µm can be normally applied. If thickness exceeds 800 µm, rigidity becomes excessively high causing inconvenience in handling such as portability, greater weight and higher costs, while if the thickness is less than 100 µm, wrinkling and folding marks form due to external force applied during repeated use or when carrying, which can cause defective magnetic scanning or poor durability. Although a single-layer substrate may be used as a card substrate, a plurality of substrates can also be used by laminating them so that their total thickness is within the aforementioned range. For example, by forming a magnetic recording layer and the like on a transparent substrate and furthermore laminating it with an opaque substrate on which a pattern layer is formed, high design qualities can be imparted and the production process can be streamlined. Similar techniques can also be applied to the back surface of a magnetic card. Consequently, when producing a magnetic recording medium for a card, there are many cases in which magnetic cards are formed by including a step in which two transparent over-sheets, wherein a magnetic recording layer or the like is formed on at least one of the over-sheets, are laminated on both sides of two opaque substrates referred to as core sheets on which are formed a pattern and the like as necessary.

A hot pressing step is carried out on the laminate, which is formed on a magnetic recording medium substrate in this manner, such that hot pressing is performed from the protective layer side to embed the entire laminate in the magnetic recording medium substrate. With the hot pressing, the surface of the protective layer which is the uppermost surface of the laminate, and the surface of the magnetic recording medium substrate, a non-magnetic support, such as a magnetic card form the same smooth plane. When producing a magnetic recording medium such as magnetic cards by laminating a plurality of substrates for magnetic recording medium, the hot pressing step may be carried out simultaneous to a step for integrating these multiple substrates into a single unit by hot pressing. For example, the aforementioned hot pressing step can be carried out simultaneous to a step for forming a sheet by using a magnetic card substrate, on which the aforementioned transfer step has been completed, as one of the overlay sheets, interposing two core sheets between the overlay sheet and another overlay sheet, and hot-pressing these four sheets into a single unit having the uniform thickness of a card.

The following provides a description of the details of a lamination laminate used in the production process of the present invention.

The sticking label laminate of the present invention is mainly used to produce a magnetic card and the like, is typically represented by magnetic tape in which a magnetic recording layer and other functional layers are laminated followed by processing into the form of a tape, and has a laminated structure comprising the formation of at least two layers consisting of a magnetic recording layer, which is substantially a functional layer for magnetic recording and reading, and a protective layer, on a non-magnetic support in the form of a lamination support, in that order.

When producing a magnetic recording medium, the sticking label laminate of the present invention is coated with an adhesive on the lamination support thereof on the opposite side of the magnetic recording layer, followed by overlaying on a magnetic recording medium substrate and hot-pressing. An adhesive layer can also be formed by coating an adhesive onto the lamination support in advance. Alternatively, an adhesive layer can be provided on the magnetic recording medium substrate in advance followed by adhering a position where the adhesive layer is provided and the surface of the sticking label laminate, which is the opposite side of the surface wherein the magnetic recording layer of the sticking label laminate is provided, and carrying out hot-pressing to produce a magnetic recording medium such as a magnetic card. In the case the magnetic recording medium substrate is made of plastic in particular, the adhesive layer is preferably provided in advance on the lamination support on the opposite side of the magnetic recording layer. As a result, a structure results in which all layers, including the lamination support of the sticking label laminate, are embedded in the magnetic recording medium substrate (see FIGS. 4, 5 and 7).

The same wax as that used for the heat transfer laminate can be used for the specific wax used in the protective layer of the sticking label laminate of the present invention.

A binder resin having high coatability and film formability in the case of forming a coated film, which has satisfactory adhesion to the magnetic recording layer, is resistant to curling and has satisfactory heat resistance is preferable for use as the binder resin contained in the protective layer of the sticking label laminate of the present invention. A wide range of binder resins suitable for known protective layers can be used when they have such properties. Examples of binder resins used include synthetic resins such as butyral resin, polyester resin, acrylic resin and polyvinyl chloride resin, and these binder resins can be used alone or a plurality of types can be used in combination. In the present invention, a composition that is crosslinked by an isocyanate compound and the like is preferable in consideration of solvent resistance.

Preparation of the protective layer coating is carried out by mixing and stirring wax particles composed of a mixture including polyethylene and polytetrafluoroethylene as previously described, the aforementioned binder resin, and as necessary, a known commonly used dispersion stabilizer, surfactant or anti-blocking agent and the like, with a stirring machine such as a disperser in a solvent for mixing such as acetone, ethyl acetate, cyclohexanone or toluene and the like, followed by uniformly dispersing. The solid content of the coating at this time is preferably 5 to 35%.

With respect to the magnetic material and binder resin used in the magnetic recording layer of the sticking label laminate of the present invention and the organic solvent and the like when preparing the magnetic recording layer coating, the same materials as those used for the magnetic recording layer of the heat transfer laminate can be used, and the magnetic recording layer can be prepared using a similar method.

The sticking label laminate used in the present invention preferably has an adhesive layer provided in advance on the lamination support on the opposite from the side on which the magnetic recording layer and the protective layer are laminated (see FIGS. 4 and 5). The adhesive layer that adheres the sticking label laminate of the present invention and the magnetic recording medium substrate can be formed by going through a coating step of a coating for forming an adhesive layer, that contains a known adhesive binder resin. The binder resin for the adhesive layer is preferably a thermoplastic binder resin that is tack-free at room temperature, but demonstrates viscous adhesion when heated, and a known, commonly used thermoplastic binder resin can be used, examples of which include polyvinyl chloride-based resins and polyurethane-based resins. Preparation of the adhesive layer coating can be carried out by, for example, dissolving the aforementioned binder resin in a solvent for mixing such as methyl ethyl ketone and toluene so that a concentration thereof is 3 to 70% by weight. In addition, an anti-blocking agent such as silica can also be added as necessary in the case of preliminarily forming an adhesive layer on the sticking label laminate.

Examples of a lamination support able to be used in the sticking label laminate of the present invention include synthetic resin films, synthetic paper and the like, and can be selected without any particular limitations provided it matches the conditions of use. In the present invention, a synthetic resin film is preferable, and in particular, a polyethylene terephthalate (PET) film having a thickness of 9 to 25 µm is particularly preferable in terms of heat resistance, tensile strength and the like. Since the support is used by being embedded in the magnetic recording medium (see FIG. 7), the thickness of the support is particularly preferably 9 to 16 µm. In addition, adhesion facilitation treatment, in which corona treatment is carried out or an adhesion facilitation agent layer is coated onto one side or both sides of a resin support, can also be carried out as necessary.

The sticking label laminate of the present invention can be formed by laminating at least a magnetic recording layer and a protective layer in that order on a lamination support. Each layer can be formed by simultaneously or sequentially coating a coating for forming each layer by a coating step. The magnetic recording layer is formed by adding an isocyanate compound as a curing agent to the aforementioned magnetic recording layer coating, and coating onto the support to achieve a dry coated film thickness of 2 to 30 µm, followed by heat curing treatment. There are no particular limitations on the coating method, a known, commonly using method can be used, and production can be carried out by employing a process for producing coated products having a single-layer or multi-layer structure. Specific examples of the method include gravure coating, reverse coating, air doctor coating, blade coating, air knife coating, squeeze coating, impregnation coating, transfer roll coating, kiss coating, cast coating, spray coating and die coating.

The dry coated film thickness of the protective layer is preferably 0.3 to 3 µm. There are no particular limitations on the drying method, and the same method can be used as that used when coating the magnetic recording layer.

The adhesive layer is formed by coating the aforementioned adhesive layer coating onto the opposite side of the lamination support on which the magnetic recording layer has been formed or onto a substrate to a dry coated film thickness of 0.3 to 10 µm. There are no particular limitations on the coating method, and the same coating method can be used as that used when coating the magnetic recording medium.

In order to impart even higher design qualities by blocking a hue of the magnetic recording layer, the sticking label laminate may be produced so that a colored layer (blocking layer) is formed or colored layer and pattern layer are formed in that order on the magnetic recording layer and a protective layer is further formed thereon when the laminate is laminated to a magnetic recording medium substrate. In this case, after having formed the magnetic recording layer on the lamination support, the colored layer is formed or the colored layer and the pattern layer are formed in that order, and then, the protective layer is laminated, and the adhesive layer is formed on the opposite side of the magnetic recording layer on the lamination support as necessary. A known production method can be used to produce the colored layer (blocking layer) and pattern layer.

A substrate having the same material and shape as that used in the case of the heat transfer laminate can be used for the magnetic recording medium substrate laminated with the aforementioned sticking label laminate.

In addition, in order to produce, for example, a magnetic card using a sticking label laminate produced using the process described above, production can be carried out by going through a known hot pressing step on a conventionally known magnetic card substrate. For example, in the case of a sticking label laminate in which an adhesive layer has been provided in advance on the opposite side of the magnetic recording layer (see FIG. 5), by adhering the adhesive layer to the surface of the magnetic recording medium substrate and fixing by applying heat and pressure, a laminate can be formed having an adhesive layer, magnetic recording layer and protective layer on a magnetic recording medium substrate.

Subsequently, the entire sticking label laminate is embedded in the substrate, and a hot pressing step is carried out so that the surface of the protective layer that is the uppermost surface of the laminate and the surface of the magnetic recording medium substrate form the same smooth plane. In cases in which the substrate is plastic, when producing a magnetic recording medium such as a magnetic card by laminating a plurality of substrates, the hot pressing step may be carried out simultaneous to a step for hot pressing this plurality of substrates into a single unit. For example, a magnetic recording medium can be produced by using a sticking label laminate, in which an adhesive layer has been provided in advance on the opposite of a magnetic recording layer on a lamination support, temporarily adhering it to a substrate by reducing hot pressing conditions to obtain an overlay sheet, interposing two core sheets between the overlay sheet and another overlay sheet, and hot-pressing these four sheets into a single unit having the uniform thickness of a card.

EXAMPLES

The following provides a more detailed explanation of the present invention through specific examples and comparative examples thereof. A description is first provided of an example of the case of laminating a magnetic laminate using a heat transfer laminate and hot pressing the laminate in a magnetic recording medium substrate, followed by a description of an example of the case of using a sticking label laminate. However, the present invention is not limited to these examples. Furthermore, the term "parts" represents parts by mass in the following descriptions.

<Protective Layer Coating (a)>

| | |
|---|---|
| Cellulose acetate (L-ACL-20, Daicel Chemical Industries, Ltd.) | 7.6 parts |
| Cellulose acetate propionate (CAP504-0.2, Eastman Chemical Co.) | 1.9 parts |
| Soybean lecithin | 0.1 parts |
| Acetone | 40 parts |
| Ethyl acetate | 40 parts |
| Cyclohexanone | 30 parts |
| Toluene | 30 parts |
| Polyethylene/PTFE wax (lubricant) (Fluoroslip 731MG, Shamrock Corp., (volume average particle diameter: approx. 5 μm) | 0.29 parts |
| Isocyanate compound (Hardener No. 50, Dainippon Ink & Chemicals, Inc.) | 4 parts |

Each of the above components was mixed, stirred and uniformly dispersed with a Disper to produce a protective layer coating (a).

Each of the following protective layer coatings was produced by changing the type of lubricant (and amount added) in the aforementioned protective layer coating (a).

<Protective Layer Coating (b)>
Protective layer coating (b) was produced in the same manner as the protective layer coating (a) with the exception of changing the amount of polyethylene/PTFE wax of the protective layer coating (a) to 0.48 parts.

<Protective Layer Coating (c)>
Protective layer coating (c) was produced in the same manner as the protective layer coating (a) with the exception of crushing the polyethylene/PTFE wax used in the protective layer coating (a) with a ball mill to a volume average particle diameter of about 2 μm and using 0.29 parts thereof as lubricant.

<Protective Layer Coating (d)>
Protective layer coating (d) was produced in the same manner as the protective layer coating (a) with the exception of crushing the polyethylene/PTFE wax used in the protective layer coating (a) with a ball mill to a volume average particle diameter of about 1 μm and using 0.29 parts thereof as lubricant.

<Protective Layer Coating (e)>
Protective layer coating (e) was produced in the same manner as the protective layer coating (a) with the exception of using 0.29 parts of a low molecular weight polyethylene wax (Hi-Wax 200PF, Mitsui Chemicals, Inc.) (average particle diameter after crushing treatment: approx. 6 μm) instead of the lubricant of the protective layer coating (a).

<Protective Layer Coating (f)>
Protective layer coating (f) was produced in the same manner as the protective layer coating (a) with the exception of using 0.29 parts of PTFE particles (Fluoro A, Shamrock Corp.) (average particle diameter: approx. 1 μm) instead of the lubricant of the protective layer coating (a).

<Protective Layer Coating (g)>
Protective layer coating (g) was produced in the same manner as the protective layer coating (a) with the exception of using 0.29 parts of polyethylene powder (FB LE-1080, Sumitomo Seika Chemicals Co., Ltd.) (average particle diameter: approx. 6 μm) instead of the lubricant of the protective layer coating (a).

<Protective Layer Coating (h)>
Protective layer coating (h) was produced in the same manner as the protective layer coating (a) with the exception of using 0.15 parts of polyethylene powder (FB LE-1080, Sumitomo Seika Chemicals Co., Ltd.) (average particle diameter: approx. 6 μm) and 0.14 parts of PTFE particles (Fluoro A, Shamrock Corp.) (average particle diameter: approx. 1 μm) instead of the lubricant of the protective layer coating (a).

<Protective Layer Coating (i)>
Protective layer coating (i) was produced in the same manner as the protective layer coating (a) with the exception of using 0.29 parts of a high molecular weight polyethylene (Mipelon PM-200, Mitsui Chemicals, Inc.) (average particle diameter: approx. 10 μm) instead of the lubricant of the protective layer coating (a).

<Protective Layer Coating (j)>
Protective layer coating (j) was produced in the same manner as the protective layer coating (a) with the exception of using 0.48 parts of silica particles (Silysia 350, Fuji Silysia Chemical, Ltd.) (average particle diameter: approx. 4 μm) instead of the lubricant of the protective layer coating (a).

<Protective Layer Coating (k)>
Protective layer coating (k) was produced in the same manner as the protective layer coating (a) with the exception of using 0.48 parts of stearic acid (NAA-180, NOF Corp.) instead of the lubricant of the protective layer coating (a).

<Protective Layer Coating (l)>
Protective layer coating (l) was produced in the same manner as the protective layer coating (a) with the exception of not adding the lubricant of the protective layer coating (a).

<Magnetic Recording Layer Coating (a)>

| | |
|---|---|
| Ba ferrite magnetic powder (MC-127, Toda Kogyo Corp.) | 40 parts |
| Vinyl chloride based resin (MR-110, Zeon Corp.) | 6 parts |
| Polyurethane resin (T-5026, Dainippon Ink & Chemicals, Inc.) | 4 parts |

-continued

| Methyl ethyl ketone | 20 parts |
| Toluene | 20 parts |
| Cyclohexanone | 8 parts |
| Isocyanate compound (Hardener No. 50, Dainippon Ink & Chemicals, Inc.) | 2 parts |

Each of the above components was kneaded and dispersed with a kneader-disperser to produce a magnetic recording layer coating.

<Adhesive Layer Coating (a)>

| Vinyl chloride-vinyl acetate copolymer resin (1000LT3, Denki Kagaku Kogyo Co., Ltd.) | 3.5 parts |
| Polyurethane resin (TS-03, Dainippon Ink & Chemicals, Inc.) | 1.5 parts |
| Methyl ethyl ketone | 45 parts |
| Toluene | 50 parts |

Each of the above components was mixed and completely dissolved with a Disper to produce an adhesive layer coating.

Example 1

The aforementioned protective layer coating (a) was coated onto a transfer support (24 μm thick, PET film) to a dry coated film thickness of 1.2 μm with a reverse coating type coating machine, and after drying in a nitrogen atmosphere, was subjected to heat curing treatment for 30 seconds at 105° C. in air to form a protective layer. The aforementioned magnetic recording layer coating was coated onto this protective layer to a dry coated film thickness of 8 μm with a reverse coating type coating machine, and after drying in a nitrogen atmosphere, was subjected to heat curing treatment for 30 seconds at 105° C. to form a magnetic recording layer. Moreover, the aforementioned adhesive layer coating was coated onto the magnetic recording layer to a dry coated film thickness of 1.5 μm with a reverse coating type coating machine followed by drying in a nitrogen atmosphere to form an adhesive layer and obtain a heat transfer laminate. This heat transfer laminate was cut to a prescribed width to produce a transfer-type magnetic recording tape.

Examples 2 to 4

Transfer-type recording tapes of Examples 2, 3 and 4 were produced in the same manner as Example 1 with the exception of using the protective layer coatings (b), (c) and (d) instead of the protective layer coating (a) used in Example 1.

Comparative Examples 1 to 8

Transfer-type magnetic tapes of Comparative Examples 1 to 8 were produced in the same manner as Example 1 with the exception of respectively using the protective layer coatings (e) to (l) instead of the protective layer coating (a) used in Example 1.

(Test Items and Test Results)

Test magnetic cards were produced under the following conditions using the transfer-type magnetic tapes obtained in Examples 1 to 4 and Comparative Examples 1 to 8.

Heat transfer conditions: Hot fusing was carried out for 5 seconds at 120° C. and 4 kgf/cm² on transfer-type tape having a tape width of 13 mm at a prescribed location of a polyvinyl chloride overlay sheet having a thickness of 100 μm using a heat sealer (Tester Sangyo Co., Ltd.) followed by peeling off the transfer support film to obtain an overlay sheet provided with magnetic tape.

Hot pressing conditions: Two polyvinyl chloride core sheets having a thickness of 280 μm were layered on the aforementioned overlay sheet provided with magnetic tape in contact therewith, and furthermore, a single polyvinyl chloride overlay sheet having a thickness of 100 μm was layered on the opposite side thereof followed by interposing the laminate between mirrored finish metal pressing plates (buffed SUS430, Nikkin Steel Co., Ltd.) and carrying out hot pressing at a temperature setting of 148° C. and pressure setting of 10 krf/cm² using a card production machine (LX-EM-4, Interline Corp.).

The resulting card base material was punched out to a prescribed size to obtain a test magnetic card (see FIGS. 2 and 3).

<Releasability Test>

Releasability between the transfer support (PET film) and protective layer, namely peel strength, was measured. If the value of peel strength was within the range of 10 to 80 mN, it was determined as "easily peelable" and was evaluated as "◯". If the value was outside this range, it was evaluated as "X". The test was carried out by cutting the heat transfer laminates obtained in Examples 1 to 4 and Comparative Examples 1 to 8 to a width of 10 mm to produce transfer-type magnetic tapes, and heat-transferring the tape to an overlay sheet made of polyvinyl chloride and having a thickness of 100 μm used as a magnetic card substrate to obtain peeling test samples prior to peeling off the transfer support. The heat transfer apparatus and heat transfer conditions were as indicated below.

Apparatus: Heat Sealer (Tester Sangyo Co., Ltd.)

Heat transfer conditions: 120° C., 0.4 kgf/cm², 9.9 sec

Next, the resulting peeling test samples were placed on a peeling tester and the amount of force required to peel the PET film from the protective layer was measured using the apparatus and under the conditions indicated below.

Apparatus: High-speed peeling tester (Tester Sangyo Co., Ltd.)

Measurement conditions: Peeling speed: 20 m/min, measured when peeling at 180°

Peak strength was read from the resulting chart and used as the value of peel strength.

<Adhesion Test>

Adhesion between the protective layer and magnetic recording layer was evaluated in accordance with the cross-cut test described in JIS K5600-5-6 using the aforementioned test magnetic cards cut to a tape width of 13 mm. It was evaluated as "◯" if there was none of the squares peeled, and evaluated as "X" in all other cases.

<Durability Test>

The aforementioned test magnetic cards were repeatedly scanned 20,000 times with a card reader/writer (Omron Corp.). The number of repeated scans was set at 20,000 based on using the card twice a day during an effective card period of five years for a total of 4,000 times, and multiplying by a factor of 5 in consideration of error caused by handling and the like in the usage environment.

Magnetic cards that allowed the magnetic recording to be read even after 20,000 repeated scans, and were able to be used in the absence of partial chipping of the magnetic recording layer existing at the surface of the magnetic tape portion on the magnetic card were evaluated as "◯" indicating satisfactory durability. Magnetic cards, in which the magnetic recording layer had become worn at the surface of the magnetic tape portion on the magnetic card due to friction with the magnetic head and the cards had partially or completely lost the magnetic recording layer following 5,000 to 20,000 repeated scans, were evaluated as "Δ" indicating insufficient durability in terms of practical use. Magnetic cards, in which the magnetic recording layer had become worn at the surface of the magnetic tape portion on the magnetic card due to friction with the magnetic head and the cards had partially or completely lost the magnetic recording layer following less than 5,000 repeated scans, were evaluated as "X" indicating poor durability.

<Test of Migration to Mirrored Finish Metal Pressing Plate>

After heat-transferring the transfer-type magnetic tapes obtained in the examples and comparative examples on a polyvinyl chloride card substrate using a card production machine (Interline Corp.), the support film was removed and the magnetic tapes were evaluated according to the test method indicated below as to the degree to which tape marks (blurring) is confirmed that were caused by migration of lubricant from the magnetic tape to the surface of a pressing plate when pressed with a mirrored finish metal pressing plate.

<Test Method for Migration to Mirrored Finish Metal Pressing Plate>

Prior to hot pressing, the gloss value of the surface of a mirrored surface metal pressing plate, that contacts a magnetic tape portion after having contacted the magnetic tape side during the production of the aforementioned test magnetic cards, was measured with a gloss meter (measuring angle: 20°, BYK-Gardner). Then, hot pressing was carried out with the test magnetic cards arranged so that the magnetic tape contacts the measured portion. Hot pressing was repeated four times using the same mirrored finish metal pressing plate and ensuring that the magnetic tape contacted the same location, a comparison was made of the gloss value of the measured site prior to hot pressing and the gloss value at the same location after repeating four times, and the change in gloss value (degree of decrease in gloss value) was evaluated according to criteria indicated below.

The following values are based on a value of 100% for the gloss value prior to pressing:

Gloss value of 95% or higher after pressing 4 times: ⊚

Gloss value of 93% to less than 95%: ○

Gloss value of 90% to less than 93%: Δ

Gloss value of less than 90%: X

The evaluation results indicate that the closer the gloss value after four rounds of pressing is to 100% (the lower the degree of the decrease in gloss value of the surface of the metal pressing plate), the smaller migration to the metal pressing plate and the smaller tape marks (blurring) of the surface of the metal pressing plate caused by migration of lubricant.

<Read and Write Properties>

In addition, read and write properties of the magnetic cards produced in the examples and comparative examples were evaluated using the "MagTester 2000" magnetic strip analyzer manufactured by Barnes International Ltd. and determined as "○" when the magnetic cards satisfied the standards described in "ISO/IEC 7811-6 Section 7.3, Table 1". The results were shown in Table 1.

The aforementioned test results are shown in Table 1 below.

TABLE 1

| | | | Lubricant in protective layer | | | Protective layer test results | | | | Reading/writing properties |
|---|---|---|---|---|---|---|---|---|---|---|
| | | Protective layer coating | Type | Particle diameter (approx.) | Amt. added (wt %) (lubricant/resin) | releasability | Adhesion | Durability (times) | Migration | test results |
| Examples | 1 | a | Polyethylene/PTFE | 5 μm | 3 wt % | ○ | ○ | ○ (>20,000) | ○ | ○ |
| | 2 | b | Polyethylene/PTFE | 5 μm | 5 wt % | ○ | ○ | ○ (>20,000) | ○ | ○ |
| | 3 | c | Polyethylene/PTFE | 2 μm | 3 wt % | ○ | ○ | ○ (>20,000) | ⊚ | ○ |
| | 4 | d | Polyethylene/PTFE | 1 μm | 3 wt % | ○ | ○ | ○ (>20,000) | ⊚ | ○ |
| Comp. Examples | 1 | e | Polyethylene | 6 μm | 3 wt % | ○ | ○ | ○ (>20,000) | X | ○ |
| | 2 | f | PTFE | 1 μm | 3 wt % | ○ | ○ | Δ (5,000) | ○ | ○ |
| | 3 | g | Polyethylene | 6 μm | 3 wt % | ○ | ○ | X (2,000) | Δ | ○ |
| | 4 | h | Polyethylene and PTFE | 6 μm/1 μm | 3 wt % (total) | ○ | ○ | X (4,000) | Δ | ○ |
| | 5 | i | High m.w. polyethylene | 10 μm | 3 wt % | ○ | ○ | X (1,500) | ○ | ○ |
| | 6 | j | Silica | 4 μm | 5 wt % | ○ | ○ | X (1,000) | ○ | ○ |
| | 7 | k | Stearic acid | Not measured | 5 wt % | ○ | ○ | X (3,000) | Δ | ○ |
| | 8 | l | None | — | — | ○ | ○ | X (<500) | ○ | ○ |

As can be understood from the results shown in Table 1, in Examples 1 to 4 that used wax particles composed of a mixture including polyethylene and PTFE, satisfactory test results were obtained for all test parameters with no deterioration of magnetic recording and reading properties. In addition, migration was able to be more effectively reduced due to the small particle diameter.

On the other hand, in the case of using polyethylene wax particles only, durability of Comparative Example 1 was satisfactory, but there was considerable migration of the wax component to the metal pressing plate. Furthermore, although the polyethylene used in Comparative Examples 3 and 5 demonstrated little migration of the wax component to the metal pressing plate, durability conversely worsened, indicating that it is difficult to realize both durability and inhibition of migration to the metal pressing plate with polyethylene wax alone.

On the other hand, in the case of using PTFE particles only, although migration to the metal pressing plate was reduced in Comparative Example 2, durability thereof was poor. In addition, in Comparative Example 4, which combined the use of PTFE particles and polyethylene wax particles, migration to the metal pressing plate increased as compared with the case of using PTFE particles alone and durability remained unimproved.

In the case of Comparative Example 6 as well, which used only silica particles, although there was little migration to the metal pressing plate, durability was not improved. In the case of Comparative Example 7, which used stearic acid that is commonly used as a lubricant, durability remained unimproved and migration to the metal pressing plate increased as compared with the use of silica particles or PTFE particles alone.

In addition, although migration was evaluated as "○" in Comparative Example 8 that did not contain an additive, durability was evaluated as "X".

The following provides a more detailed explanation of the present invention through specific examples and comparative examples thereof. However, the present invention is not limited to these examples. Furthermore, the term "parts" represents parts by mass in the following descriptions.

<Protective Layer Coating (m)>

| | |
|---|---|
| Butyral resin (S-LEC KS-1, Sekisui Chemical Co., Ltd.) | 20 parts |
| Soybean lecithin | 1 part |
| Acetone | 90 parts |
| Ethyl acetate | 90 parts |
| Cyclohexanone | 70 parts |
| Toluene | 70 parts |
| Polyethylene/PTFE wax (lubricant) (Fluoroslip 731MG, Shamrock Corp. (volume average particle diameter: approx. 5 μm) | 0.6 parts |
| Isocyanate compound (Hardener No. 50, Dainippon Ink & Chemicals, Inc.) | 8.5 parts |

Each of the above components was mixed, stirred and uniformly dispersed with a Disper to produce a protective layer coating (m).

Each of the following protective layer coatings was produced by changing the type of lubricant (and amount added) in the aforementioned protective layer coating (m).

<Protective Layer Coating (n)>

A protective layer coating (n) was produced in the same manner as the protective layer coating (m) with the exception of changing the amount of polyethylene/PTFE wax used in protective layer coating (m) to 1 part.

<Protective Layer Coating (o)>

A protective layer coating (o) was produced in the same manner as the protective layer coating (m) with the exception of crushing the polyethylene/PTFE wax used in the protective layer coating (m) with a ball mill to a volume average particle diameter of about 1 μm and using 0.6 parts thereof as lubricant.

<Protective Layer Coating (p)>

| | |
|---|---|
| Butyral resin (S-LEC BM-1, Sekisui Chemical Co., Ltd.) | 48 parts |
| Soybean lecithin | 2.4 parts |
| Methyl ethyl ketone | 200 parts |
| Cyclohexanone | 48 parts |
| Toluene | 200 parts |
| Polyethylene/PTFE wax (lubricant) (Fluoroslip 731MG, Shamrock Corp. (volume average particle diameter: approx. 5 μm) | 1.5 parts |
| Isocyanate compound (Hardener No. 50, Dainippon Ink & Chemicals, Inc.) | 18.5 parts |

Each of the above components was mixed, stirred and uniformly dispersed with a Disper to produce a protective layer coating (p).

<Protective Layer Coating (q)>

A protective layer coating (q) was produced in the same manner as the protective layer coating (m) with the exception of adding 0.6 parts of silica particles (Silysia 350, Fuji Silysia Chemical, Ltd.) (average particle diameter: approx. 4 μm) to the protective layer coating (m).

<Protective Layer Coating (r)>

A protective layer coating (r) was produced in the same manner as the protective layer coating (p) with the exception of adding 2.5 parts of silica particles (Silysia 350, Fuji Silysia Chemical, Ltd.) to the protective layer coating (p).

<Protective Layer Coating (s)>

A protective layer coating (s) was produced in the same manner as the protective layer coating (m) with the exception of using 0.6 parts of low molecular weight polyethylene wax (Hi-Wax 200PF, Mitsui Chemicals, Inc.) (average particle diameter after crushing treatment: approx. 6 μm) instead of the lubricant used in the protective layer coating (m).

<Protective Layer Coating (t)>

A protective layer coating (t) was produced in the same manner as the protective layer coating (m) with the exception of using 0.6 parts of PTFE particles (Fluoro A, Shamrock Corp.) (average particle diameter: approx. 1 μm) instead of the lubricant used in the protective layer coating (m).

<Protective Layer Coating (u)>

A protective layer coating (u) was produced in the same manner as the protective layer coating (m) with the exception of using 0.6 parts of polyethylene powder (FB LE-1080, Sumitomo Seika Chemicals Co., Ltd.) (average particle diameter: approx. 6 μm) instead of the lubricant used in the protective layer coating (m).

<Protective Layer Coating (v)>

A protective layer coating (v) was produced in the same manner as the protective layer coating (p) with the exception of using 1.5 parts of silica particles (Silysia 350, Fuji Silysia Chemical, Ltd.) (average particle diameter: approx. 4 μm) instead of the lubricant used in the protective layer coating (p).

<Protective Layer Coating (w)>

A protective layer coating (w) was produced in the same manner as the protective layer coating (m) with the exception of not adding the lubricant used in protective layer coating (m).

<Protective Layer Coating (x)>

A protective layer coating (x) was produced in the same manner as the protective layer coating (p) with the exception of not adding the lubricant used in protective layer coating (p).

<Magnetic Recording Layer Coating (b)>

| | |
|---|---|
| Magnetic powder (QX-440, Toda Kogyo Corp.) | 150 parts |
| Vinyl chloride based resin (Solbin-TAO, Nissin Chemical Industry Co., Ltd.) | 20 parts |

-continued

| | |
|---|---|
| Polyurethane resin (T-5026L, Dainippon Ink & Chemicals, Inc.) | 13 parts |
| Polyurethane resin (TS-03, Dainippon Ink & Chemicals, Inc.) | 32 parts |
| Soybean lecithin | 3 parts |
| Methyl ethyl ketone | 125 parts |
| Toluene | 170 parts |
| Cyclohexanone | 50 parts |
| Isocyanate compound (Hardener No. 50, Dainippon Ink & Chemicals, Inc.) | 25 parts |

Each of the above components was kneaded and dispersed with a kneader-disperser to produce a magnetic recording layer coating (b).

<Adhesive Layer Coating (b)>

| | |
|---|---|
| Vinyl chloride-vinyl acetate copolymer resin (1000LT3, Denki Kagaku Kogyo Co., Ltd.) | 3.5 parts |
| Polyurethane resin (TS-03, Dainippon Ink & Chemicals, Inc.) | 1.5 parts |
| Methyl ethyl ketone | 45 parts |
| Toluene | 50 parts |

Each of the above components was mixed and completely dissolved with a Disper to produce an adhesive layer coating.

Example 5

The aforementioned magnetic recording layer coating was coated onto a resin support of a sticking label laminate (12 μm thick, PET film) to a dry coated film thickness of 8 μm with a reverse coating type coating machine, and after drying in a nitrogen atmosphere, was subjected to heat curing treatment for 30 seconds at 105° C. to form a magnetic recording layer. The aforementioned protective layer coating (m) was coated onto the magnetic recording layer to a dry coated film thickness of 2 μm with a reverse coating type coating machine, and after drying in a nitrogen atmosphere, was subjected to heat curing treatment for 30 seconds at 105° C. in air to form a protective layer. The aforementioned adhesive layer coating was coated on the side of the support, which is opposite to the side on which the magnetic recording layer and protective layer were formed, to a dry coated film thickness of 2 μm with a reverse coating type coating machine followed by drying in a nitrogen atmosphere to form an adhesive layer and obtain a sticking label laminate. This sticking label laminate was cut to a prescribed width to produce a magnetic tape for a lamination step.

Examples 6 to 9

Magnetic tapes for a lamination step of Examples 6 to 9 were produced in the same manner as Example 5 with the exception of using the protective layer coatings (n) to (q) instead of the protective layer coating (m) used in Example 5.

Example 10

The aforementioned magnetic recording layer coating was coated onto a support of a sticking label laminate (12 μm thick, PET film) to a dry coated film thickness of 8 μm with a reverse coating type coating machine, and after drying in a nitrogen atmosphere, was subjected to heat curing treatment for 30 seconds at 105° C. to form a magnetic recording layer. The aforementioned protective layer coating (r) was coated onto the magnetic recording layer to a dry coated film thickness of 2.5 μm with a reverse coating type coating machine, and after drying in a nitrogen atmosphere, was subjected to heat curing treatment for 30 seconds at 105° C. in air to form a protective layer and obtain a sticking label laminate. This sticking label laminate was cut to a prescribed width to produce a magnetic tape for a lamination step of Example 10.

Comparative Examples 9 to 14

Magnetic tapes for a lamination step of Comparative Examples 9 to 14 were produced in the same manner as Example 1 with the exception of respectively using the protective layer coatings (s) to (x) instead of the protective layer coating (m) used in Example 1.

(Test Items and Test Results)

Test magnetic cards were produced under the following conditions using the magnetic tapes for a lamination step obtained in Examples 5 to 10 and Comparative Examples 9 to 14.

Lamination conditions: Hot fusing was carried out for 5 seconds at 120° C. and 4 kgf/cm² using a heat sealer (Tester Sangyo Co., Ltd.) to obtain an overlay sheet provided with magnetic tape.

Hot pressing conditions: Two polyvinyl chloride core sheets having a thickness of 280 μm were layered on an overlay sheet, made of polyvinyl chloride and having a thickness of 100 μm and in which magnetic tape having a tape width of 13 mm was arranged, and a single polyvinyl chloride overlay sheet having a thickness of 100 μm was layered on the opposite side of the aforementioned overlay sheet. The laminate was interposed between mirrored finish metal pressing plates (buffed SUS430, Nikkin Steel Co., Ltd.) and hot pressing of the laminate was carried out at a temperature setting of 148° C. using a card production machine (LX-EM-4, Interline Corp.). Furthermore, in the magnetic tape of Example 6, an adhesive layer having a thickness of 2.5 μm was formed by spray-coating onto the support on the opposite side from the magnetic recording layer prior to hot-pressing with the overlay sheet. The resulting card substrate was punched out to a prescribed size to obtain a test magnetic card (see FIGS. 6 and 7).

<Durability Test>

The aforementioned test magnetic cards were repeatedly scanned 20,000 times with a card reader/writer (Omron Corp.). The number of repeated scans was set at 20,000 based on using the card twice a day during an effective card period of five years for a total of 4,000 times, and multiplying by a factor of 5 in consideration of error caused by handling and the like in the usage environment.

Magnetic cards that allowed the magnetic recording to be read even after 20,000 repeated scans, and were able to be used in the absence of partial chipping of the magnetic recording layer existing at the surface of the magnetic tape portion on the magnetic card were evaluated as "◯" indicating satisfactory durability. Magnetic cards, in which the magnetic recording layer had become worn at the surface of the magnetic tape portion on the magnetic card due to friction with the magnetic head and the cards had partially or completely lost the magnetic recording layer following 5,000 to 20,000 repeated scans were evaluated as "Δ" indicating insufficient durability in terms of practical use. Magnetic cards, in which the magnetic recording layer had become worn at the surface of the magnetic tape portion on the magnetic card due to friction with the magnetic head and the card had partially or completely lost the magnetic recording layer following less than 5,000 repeated scans, were evaluated as "X" indicating poor durability.

<Reading and Writing Properties>

Magnetic reading and writing properties of the magnetic cards evaluated in the durability test were evaluated using the "MagTester 2000" magnetic strip analyzer manufactured by Barnes International Ltd. and determined as "○" when the magnetic cards satisfied the standards described in "ISO/IEC 7811-6 Section 7.3, Table 1".

<Test of Migration to Mirrored Finish Metal Pressing Plate>

The magnetic tapes obtained in the examples and comparative examples were evaluated according to the test method indicated below as to the degree to which tape marks (blurring) is confirmed that were caused by migration of lubricant from the magnetic tape to the surface of a pressing plate when the magnetic cards were hot-pressed with a mirrored finish metal pressing plate using a card production machine (Interline Corp.).

<Test Method for Migration to Mirrored Finish Metal Pressing Plate>

Prior to hot pressing, the gloss value of the surface of a mirrored surface metal pressing plate, that contacts a magnetic tape portion after having contacted the magnetic tape side during the production of the aforementioned test magnetic cards, was measured with a gloss meter (measuring angle: 20°, BYK-Gardner). Then, hot pressing was carried out with the test magnetic cards arranged so that the magnetic tape contacts the measured portion. Hot pressing was repeated four times using the same mirrored finish metal pressing plate and ensuring that the magnetic tape contacted the same location, a comparison was made of the gloss value of the measured site prior to hot pressing and the gloss value at the same location after repeating four times, and the change in gloss value (degree of decrease in gloss value) was evaluated according to criteria indicated below.

The following values are based on a value of 100% for the gloss value prior to pressing:

Gloss value of 95% or higher after pressing 4 times: ◉
Gloss value of 93% to less than 95%: ○
Gloss value of 90% to less than 930: Δ
Gloss value of less than 900: X Furthermore, the evaluation results indicate that little migration to the metal pressing plate and few tape marks (blurring) of the surface of the metal pressing plate caused by migration of lubricant can be achieved, when the closer the gloss value after four rounds of pressing is to 100% (the lower the degree of the decrease in gloss value of the surface of the metal pressing plate).

The aforementioned test results are shown in the following Table 2.

TABLE 2

| | | | | Lubricant in protective layer | | | | |
|---|---|---|---|---|---|---|---|---|
| | | Protective layer coating | | | Polyethylene/PTFE conditions | | Protective layer test results | Reading/writing property test results |
| | | Type | Binder | Type of lubricant | Particle diameter (approx) | Added amt. (ratio to resin) | Durability Migration | |
| Examples | 5 | m | KS-1 | Polyethylene/PTFE | 5 μm | 3 wt % | ○ ○ | ○ |
| | 6 | n | KS-1 | Polyethylene/PTFE | 5 μm | 5 wt % | ○ ○ | ○ |
| | 7 | o | KS-1 | Polyethylene/PTFE | 1 μm | 3 wt % | ○ ◉ | ○ |
| | 8 | p | BM-1 | Polyethylene/PTFE | 5 μm | 3 wt % | ○ ○ | ○ |
| | 9 | q | KS-1 | Polyethylene/PTFE + silica | 5 μm | 3 wt % | ○ ◉ | ○ |
| | 10 | r | BM-1 | Polyethylene/PTFE + silica | 1 μm | 3 wt % | ○ ◉ | ○ |
| Comparative Examples | 9 | s | KS-1 | Polyethylene | 6 μm | 3 wt % | ○ X | ○ |
| | 10 | t | KS-1 | PTFE | 1 μm | 3 wt % | X ◉ | ○ |
| | 11 | u | KS-1 | Polyethylene | 6 μm | 3 wt % | X Δ | ○ |
| | 12 | v | BM-1 | Silica | 4 μm | 3 wt % | X ◉ | ○ |
| | 13 | w | KS-1 | — | — | — | X ◉ | ○ |
| | 14 | x | BM-1 | — | — | — | X ◉ | ○ |

As can be understood from the results shown in Table 2, in Examples 5 to 10 that used wax particles composed of a mixture comprising polyethylene and PTFE, satisfactory test results were obtained for all test items without impairing magnetic reading and writing properties. In addition, migration was able to be more effectively reduced by reducing particle diameter and combining the use of silica particles.

On the other hand, in the case of using polyethylene wax particles only, durability of Comparative Example 9 was satisfactory, but there was considerable migration of the wax component to the metal pressing plate. Furthermore, although the polyethylene used in Comparative Example 11 demonstrated little migration of the wax component to the metal pressing plate, durability conversely worsened, indicating that it is difficult to realize both durability and inhibition of migration to the metal pressing plate with polyethylene wax alone.

On the other hand, in the case of using PTFE particles only as in Comparative Example 10, although migration to the metal pressing plate was reduced, durability was poor. In addition, in the case of Comparative Example 12 in which only silica particles were used, although there was little migration to the metal pressing plate, durability was not improved. In addition, in Comparative Examples 13 and 14 in which a lubricant was not added, although migration was satisfactory, durability decreased considerably.

BRIEF DESCRIPTION OF THE REFERENCE SYMBOLS

Figure 1:
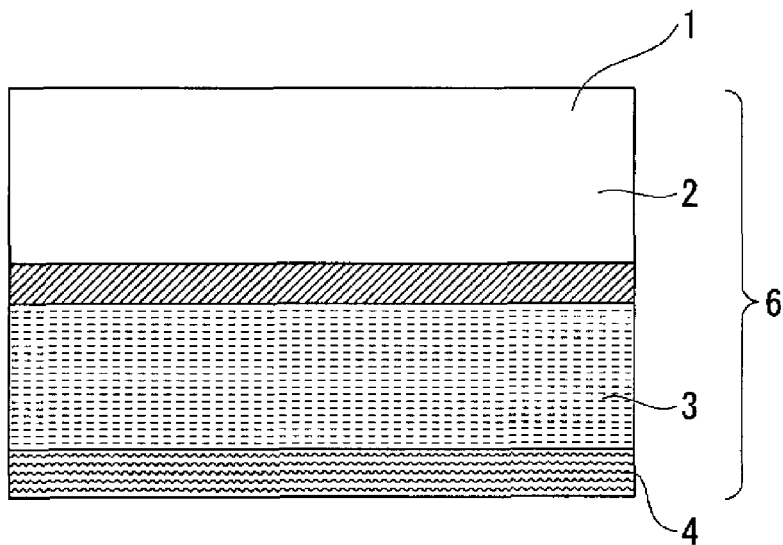
FIG. 1 is a cross-sectional view showing an example of a heat transfer laminate of the present invention.
Figure 2:
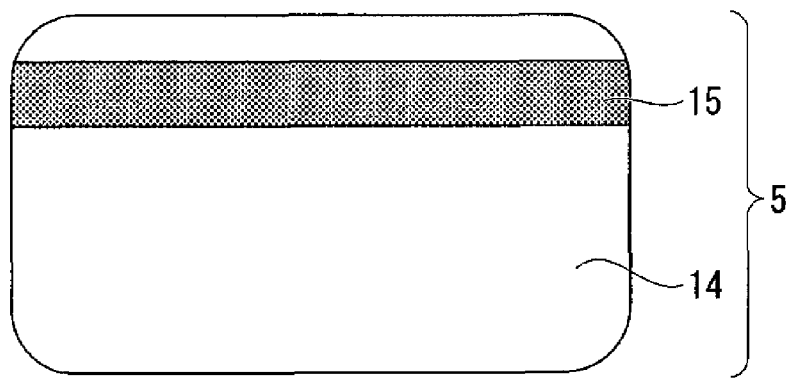
FIG. 2 is a front view showing an example of a card-like magnetic recording medium produced using the heat transfer laminate of the present invention.
Figure 3:
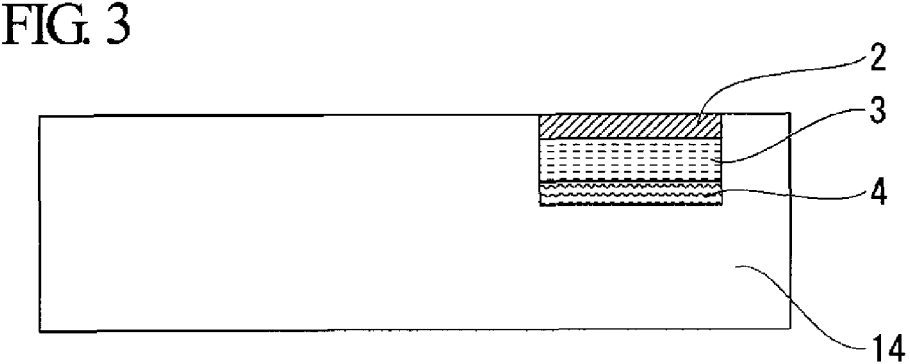
FIG. 3 is a cross-sectional view showing an example of a card-like magnetic recording medium produced using the heat transfer laminate of the present invention.
Figure 4:
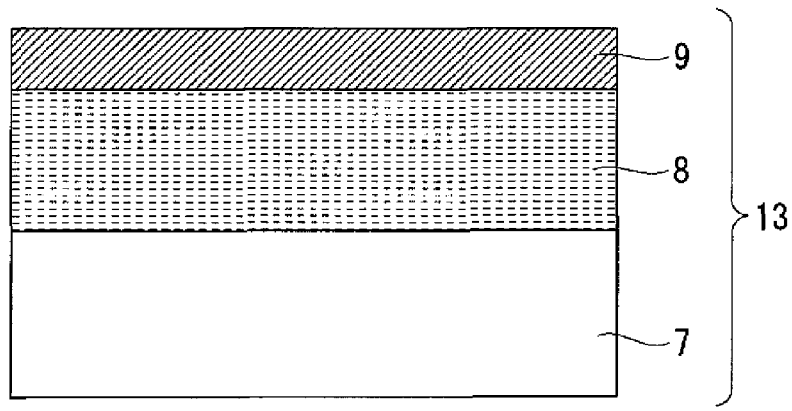
FIG. 4 is a cross-sectional view showing an example of a sticking label laminate of the present invention.
Figure 5:
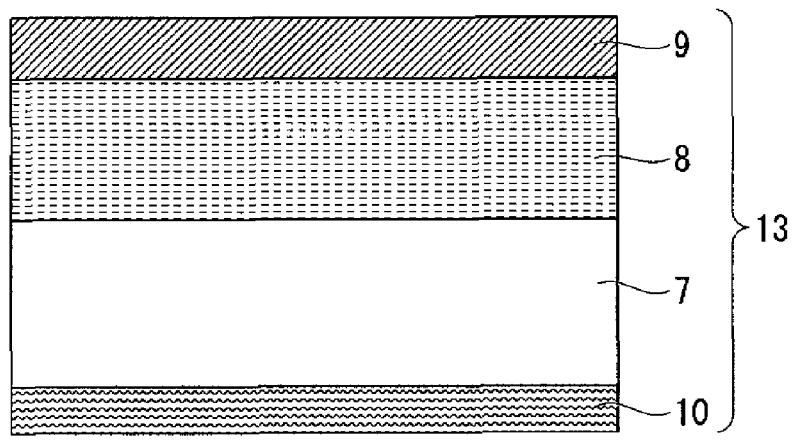
FIG. 5 is a cross-sectional view showing an example of a sticking label laminate of the present invention.
Figure 6:
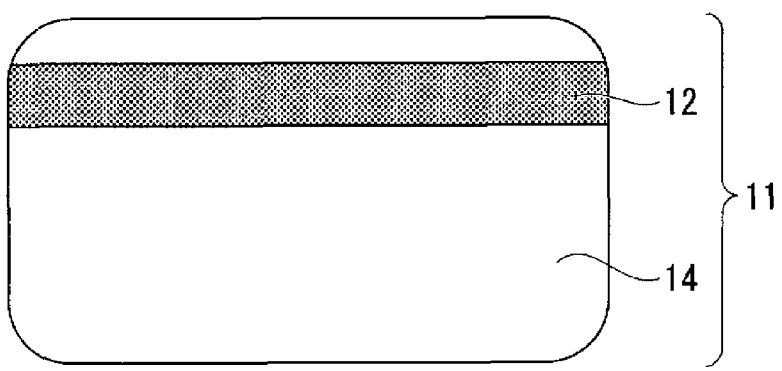
FIG. 6 is a front view showing an example of a card-like magnetic recording medium produced using the sticking label laminate of the present invention.
Figure 7:
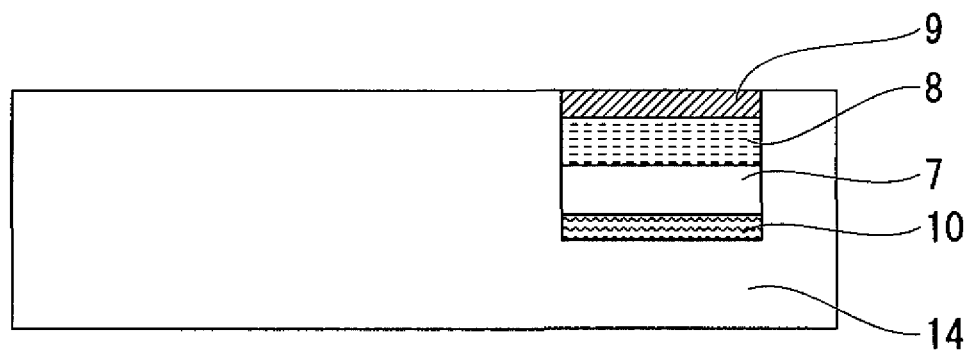
FIG. 7 is a cross-sectional view showing an example of a card-like magnetic recording medium produced using the sticking label laminate of the present invention.

| | |
|---|---|
| 1 | Transfer support |
| 2 | Protective layer |
| 3 | Magnetic recording layer |
| 4 | Adhesive layer |
| 5 | Magnetic card produced by going through transfer step |
| 6 | Transfer laminate |
| 7 | Sticking label laminate |
| 8 | Magnetic recording layer |
| 9 | Protective layer |
| 10 | Adhesive layer |
| 11 | Magnetic card produced by going through lamination step |
| 12 | Magnetic stripe formed using sticking label laminate |
| 13 | Sticking label laminate |
| 14 | Magnetic recording medium substrate (card substrate) |
| 15 | Magnetic stripe formed using transfer laminate |

The invention claimed is:

1. A heat transfer laminate, wherein at least a protective layer, a magnetic recording layer and an adhesive layer are laminated in this order on a transfer support, and the protective layer contains a binder resin and particles composed of a mixture including polyethylene and polytetrafluoroethylene, wherein the particles are composite particles in which at least a portion of polytetrafluoroethylene particles are embedded in particles which includes polyethylene as a main component.

2. The heat transfer laminate according to claim 1, wherein the particles have an irregular shape.

3. The heat transfer laminate according to claim 2, wherein the volume average particle diameter of the particles is 6 µm or less.

4. A process for producing a magnetic recording medium, comprising:
providing the heat transfer laminate according to claim 1,
laminating the heat transfer laminate on a substrate of a non-magnetic support such that the substrate contacts the adhesive layer, and removing the transfer support from the heat transfer laminate, and
embedding the heat transfer laminate into the substrate by carrying out hot pressing on the protective layer to provide a level smooth plane formed by the surface of the substrate and an uppermost surface of the heat transfer laminate.

5. The process for producing a magnetic recording medium according to claim 4, wherein the particles have an irregular shape.

6. The process for producing a magnetic recording medium according to claim 5, wherein the volume average particle diameter of the particles is 6 µm or less.

7. The process for producing a magnetic recording medium according to claim 4, wherein formation of the heat transfer laminate on the substrate is carried out by going through a transfer step using the heat transfer laminate.

8. A sticking label laminate comprising a magnetic recording layer and a protective layer on one side of a support in this order from the side near the support, wherein the protective layer contains a binder resin and particles composed of a mixture including polyethylene and polytetrafluoroethylene, and wherein the particles are composite particles in which at least a portion of polytetrafluoroethylene particles are embedded in particles which includes polyethylene as a main component.

9. The sticking label laminate according to claim 8, wherein the particles have a non-spherical, irregular shape.

10. The sticking label laminate according to claim 9, wherein the volume average particle diameter of the particles is 6 µm or less.

11. The process for producing a magnetic recording medium,
providing the sticking label according to claim 8,
laminating the sticking label laminate on a substrate of a non-magnetic support such that the substrate contacts the adhesive layer, and
embedding the sticking label laminate into the substrate by carrying out pressing on the protective layer to provide a level smooth plane formed by the surface of the substrate and an uppermost surface of the sticking label laminate.

* * * * *